US010813112B2

(12) United States Patent
Morris

(10) Patent No.: US 10,813,112 B2
(45) Date of Patent: Oct. 20, 2020

(54) APPLICATION AWARE SCHEDULING AND RESOURCE MANAGEMENT

(71) Applicant: Telefonaktiebolaget LM Ericsson (publ), Stockholm (SE)

(72) Inventor: Rick Morris, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 16/309,323

(22) PCT Filed: Jun. 13, 2016

(86) PCT No.: PCT/IB2016/053484
§ 371 (c)(1),
(2) Date: Dec. 12, 2018

(87) PCT Pub. No.: WO2017/216601
PCT Pub. Date: Dec. 21, 2017

(65) Prior Publication Data
US 2019/0261392 A1    Aug. 22, 2019

(51) Int. Cl.
*H04W 72/04*    (2009.01)
*H04W 72/12*    (2009.01)
*H04W 80/02*    (2009.01)
*H04W 80/12*    (2009.01)

(52) U.S. Cl.
CPC ... *H04W 72/1257* (2013.01); *H04W 72/0493* (2013.01); *H04W 72/1284* (2013.01); *H04W 80/02* (2013.01); *H04W 80/12* (2013.01)

(58) Field of Classification Search
CPC ......... H04W 72/1257; H04W 72/1284; H04W 72/0493; H04W 80/02; H04W 80/12
See application file for complete search history.

(56) References Cited

U.S. PATENT DOCUMENTS 6,026,097 A  *  2/2000  Voois ..................... H04N 7/52
                                                     370/468
7,151,749 B2 * 12/2006  Vega-Garcia ........... H04L 29/06
                                                     370/241.1
9,167,618 B2 * 10/2015  Brisebois ............... H04W 76/38
(Continued)

FOREIGN PATENT DOCUMENTS

EP         2 879 339 A1     3/2015

OTHER PUBLICATIONS

International Search Report and Written Opinion dated Feb. 28, 2017 issued in corresponding PCT Application No. PCT/IB2016053484, consisting of 17 pages.

*Primary Examiner* — Hassan Kizou
*Assistant Examiner* — Mahbubal Bar Chowdhury
(74) *Attorney, Agent, or Firm* — Sage Patent Group

(57) ABSTRACT

A method, wireless device, and network entity for communicating real time data communication requirements for applications running on a wireless device. The method includes identifying a change in a data communication requirement for an application running on an application layer of a communication reference model of the wireless device, and providing to a lower layer of the communication reference model, the lower layer being lower than the application layer, a data profile, the data profile representing the change in the data requirements for the application running on the application layer of the wireless device.

18 Claims, 8 Drawing Sheets

(56) References Cited

U.S. PATENT DOCUMENTS

| | | | |
|---|---|---|---|
| 2007/0064604 A1* | 3/2007 | Chen | H04L 1/0002 |
| | | | 370/230 |
| 2012/0002614 A1* | 1/2012 | Ekici | H04W 28/24 |
| | | | 370/329 |
| 2012/0140633 A1* | 6/2012 | Stanwood | H04L 47/2425 |
| | | | 370/235 |
| 2012/0281561 A1* | 11/2012 | Shukla | H04W 76/38 |
| | | | 370/252 |
| 2014/0233479 A1* | 8/2014 | Dahod | H04W 76/27 |
| | | | 370/329 |
| 2015/0026309 A1 | 1/2015 | Radcliffe et al. | |
| 2018/0295658 A1* | 10/2018 | Zhang | H04W 48/16 |

* cited by examiner

APPLICATION AWARE SCHEDULING AND RESOURCE MANAGEMENT

CROSS-REFERENCE TO RELATED APPLICATIONS

This application is a Submission Under 35 U.S.C. § 371 for U.S. National Stage Patent Application of International Application Number: PCT/IB2016/053484, filed Jun. 13, 2016 entitled "APPLICATION AWARE SCHEDULING AND RESOURCE MANAGEMENT," the entirety of which is incorporated herein by reference.

TECHNICAL FIELD

The present disclosure relates to communication systems and in particular, to a method, wireless device and network entity configured to communicate real time data communication requirements for applications running on a wireless device.

BACKGROUND

Within a communications network, a base station, such as, for example, an evolved Node B (eNB), is responsible for the resource scheduling decisions for other wireless devices, for example, user equipments (UEs) in the network. The base station is also responsible for resource management algorithm decisions for these wireless devices. In order for the base station to make more "informed" scheduling and resource management algorithm decisions for the wireless devices, the base station requires real time data requirements for the applications running on each of the wireless devices of the communications network. However, the only data requirements generally known by the base station are the guaranteed bit rate (GBR), multiple bit rate (MBR) and average bit rate (ABR). This information alone does not provide any real time feedback to the base station about the actual and rapidly changing (i.e., very dynamic) data requirements for applications currently running on the wireless devices.

It is often the case that the base station is not aware of the data requirements for each of the applications running on the wireless devices. It is also often the case that the base station may receive separate indications of the data requirements for certain applications but because of the dynamic nature of many applications, the data requirements are constantly changing and the data requirements the base station receives from the wireless devices may not be accurate.

SUMMARY

Aspects of the present disclosure advantageously provide methods, wireless devices and network entities for communicating real time data communication requirements for applications running on a wireless device. According to one aspect, a method includes identifying a change in a data communication requirement for an application running on an application layer of a communication reference model of the wireless device, and providing to a lower layer of the communication reference model, the lower layer being lower than the application layer, a data profile, the data profile representing the change in the data requirements for the application running on the application layer of the wireless device.

According to this aspect, in some embodiments, the method includes creating an aggregate data profile, the aggregate data profile representing additional data profiles and the data profile, each of the additional data profiles representing changes in data requirements for corresponding applications running on the application layer of the wireless device. In some embodiments, the lower communication reference model layer is a media access control (MAC) layer of an Open System Communication Interconnection (OSI) communication reference model. In some embodiments, changes in the data requirements include at least one of starting the application, pausing the application, stopping the application, and any changes to the application that result in a change in data requirements above a threshold amount. In some embodiments, creating the aggregate data profile occurs at a media access control (MAC) layer of an Open System Communication Interconnection (OSI) communication reference model.

In some embodiments, the method further includes transmitting, to a network entity at a first predetermined time interval, an aggregate data profile message based on the aggregate data profile. In some embodiments, the method includes transmitting additional aggregate data profile messages to the network entity at the first predetermined time interval. In some embodiments, the method includes partitioning data profiles in the aggregate data profile according to applications for a common bearer and transmitting, to the network entity, the aggregate data profile according to the partitioned data profiles.

According to another aspect, a wireless device configured to communicate real time data communication requirements for applications running on the wireless device is provided. The wireless device includes a communications interface and processing circuitry. The processing circuitry includes a memory and a processor, the memory in communication with the processor. The memory has instructions that, when executed by the processor, configure the processor to identify a change in a data communication requirement for an application running on an application layer of a communication reference model of the wireless device, and provide to a lower layer of the communication reference model layer, the lower layer being lower than the application layer, a data profile, the data profile representing the change in the data communication requirements for the application running on the application layer of the wireless device.

According to this aspect, in some embodiments, the memory further stores instructions that, when executed, configure the processor to create an aggregate data profile, the aggregate data profile representing the additional data profiles and the data profile, each of the additional data profiles representing changes in data communication requirements for corresponding applications running on the application layer of the wireless device. In some embodiments, the lower communication reference model layer is a media access control (MAC) layer of an Open System Communication Interconnection (OSI) communication reference model. In some embodiments, changes in the data requirements include at least one of starting the application, pausing the application, stopping the application, and any changes to the application that result in a change in data requirements above a threshold amount. In some embodiments, aggregating additional data profiles with the data profile occurs at a media access control (MAC) layer of an Open System Communication Interconnection (OSI) communication reference model.

In some embodiments, the communications interface is configured to transmit, to a network entity at a first predetermined time interval, an aggregate data profile message based on the aggregate data profile. In some embodiments, the communications interface is configured to transmit additional aggregate data profile message to the network entity at the first predetermined time interval. In some embodiments, the memory further stores instructions that, when executed, configure the processor to partition data profiles in the aggregate data profile according to applications for a common bearer, wherein the communications interface is configured to transmit, to the network entity, the aggregate data profile according to the partitioned data profiles.

According to another aspect, a method for providing a network entity with real time data communication requirements of applications in a wireless device is provided. The method includes identifying a change in a data communication requirement for at least one application running on the wireless device, creating at least one data profile, each of the at least one data profile representing changes in data communication requirements for corresponding applications running on the wireless device, and transmitting, to the network entity, a data profile message based on the at least one data profile, the data profile message being usable by the network entity to manage wireless communications for the wireless device.

According to this aspect, in some embodiments, the method includes combining each of the at least one data profile into an aggregate data profile, and transmitting, to the network entity at a first predetermined time interval, the an aggregate data profile message based on the aggregate data profile. In some embodiments, changes in the data requirements include at least one of starting the application, pausing the application, stopping the application, and any changes to the application that result in a change in data requirements above a threshold amount. In some embodiments, the method includes transmitting additional aggregate data profile messages to the network entity at the first predetermined time interval.

In some embodiments, the method includes partitioning data profiles in the aggregate data profile according to applications for a common bearer and transmitting, to the network entity, the aggregate data profile according to the partitioned data profiles. In some embodiments, each of the at least one data profile is combined into an aggregate data profile by the network entity According to another aspect, a wireless device configured to provide for a network entity with real time data communication requirements of applications in the wireless device is provided. The wireless device includes processing circuitry that includes a memory and a processor, the memory in communication with the processor. The memory has instructions that, when executed by the processor, configure the processor identify a change in a data communication requirement for at least one application running on a wireless device, and create at least one data profile, each of the at least one data profile representing changes in data communication requirements for corresponding applications running on the wireless device. The wireless device also includes a communications interface configured to transmit, to the network entity, a data profile message based on the at least one data profile, the data profile message being usable by the network entity to manage wireless communications for the wireless device.

According to this aspect, in some embodiments, the memory further stores instructions that, when executed, configure the processor to combine each of the at least one data profile into an aggregate data profile, wherein the communication interface is configured to transmit, to the network entity at a first predetermined time interval, an aggregate data profile message based on the aggregate data profile. In some embodiments, changes in the data requirements include at least one of starting the application, pausing the application, stopping the application, and any changes to the application that result in a change in data requirements above a threshold amount.

In some embodiments, the communication interface is further configured to transmit additional aggregate data profile messages to the network entity at the first predetermined time interval. In some embodiments, the memory further stores instructions that, when executed, configure the processor to partition data profiles in the aggregate data profiles according to applications for a common bearer, wherein the communication interface is further configured to transmit, to the network entity, the aggregate data profile message according to the partitioned data profiles.

According to another aspect, a method for managing wireless device communications based on real time data communication requirements for applications running on the wireless device is provided. The method includes receiving, from the wireless device, at least one data profile message, each of the at least one data profile message representing changes in data communication requirements for a corresponding application running on the wireless device, and utilizing the received at least one data profile message to manage wireless communications for the wireless device.

According to this aspect, in some embodiments, the method includes combining each of the at least one data profile into an aggregate data profile, the aggregate data profile being used to manage the wireless communications for the wireless device. In some embodiments, the method includes partitioning data profiles in the aggregate data profile according to applications for a common bearer, the partitioned data profiles being used to manage the wireless communications for the wireless device. In some embodiments, the method includes receiving an aggregate data profile message from the wireless device at a first predetermined time interval, wherein the aggregate data profile message includes each of the at least one data profiles, the aggregate data profile message being used to manage the wireless communications for the wireless device.

In some embodiments, the method includes receiving additional aggregate data profile message from the wireless device at the first predetermined time interval. In some embodiments, the method includes receiving, from the wireless device, partitioned data profiles, the partitioned data profiles representing data profiles corresponding to applications for a common bearer, the partitioned data profiles being used to manage the wireless communications for the wireless device.

According to another aspect, a network entity configured to manage wireless device communications with real time data communication requirements of applications running on the wireless device is provided. The network entity includes a communication interface configured to receive, from the wireless device, at least one data profile message, each of the at least one data profile message representing changes in data communication requirements for a corresponding application running on the wireless device. The network entity also includes a processing circuitry that includes a memory, and a processor, the memory in communication with the processor. The memory has instructions that, when executed by the processor, configure the processor to utilize the received at least one data profile message to manage wireless communications for the wireless device.

According to this aspect, in some embodiments, the memory further stores instructions that, when executed, configure the processor to combine each of the at least one data profile into an aggregate data profile, the aggregate data profile being used to manage the wireless communications for the wireless device. In some embodiments, the memory further stores instructions that, when executed, configure the processor to partition data profiles in the aggregate data profile according to applications for a common bearer, the partitioned data profiles being used to manage the wireless communications for the wireless device.

In some embodiments, the communication interface is further configured to receive an aggregate data profile message from the wireless device at a first predetermined time interval, wherein the aggregate data profile message includes each of the at least one data profiles, the aggregate data profile message being used to manage the wireless communications for the wireless device. In some embodiments, the communication interface is further configured to receive additional aggregate data profile messages from the wireless device at the first predetermined time interval. In some embodiments, the communications interface is further configured to receive, from the wireless device, partitioned data profiles, the partitioned data profiles representing data profiles corresponding to applications for a common bearer, the partitioned data profiles being used to manage the wireless communications for the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
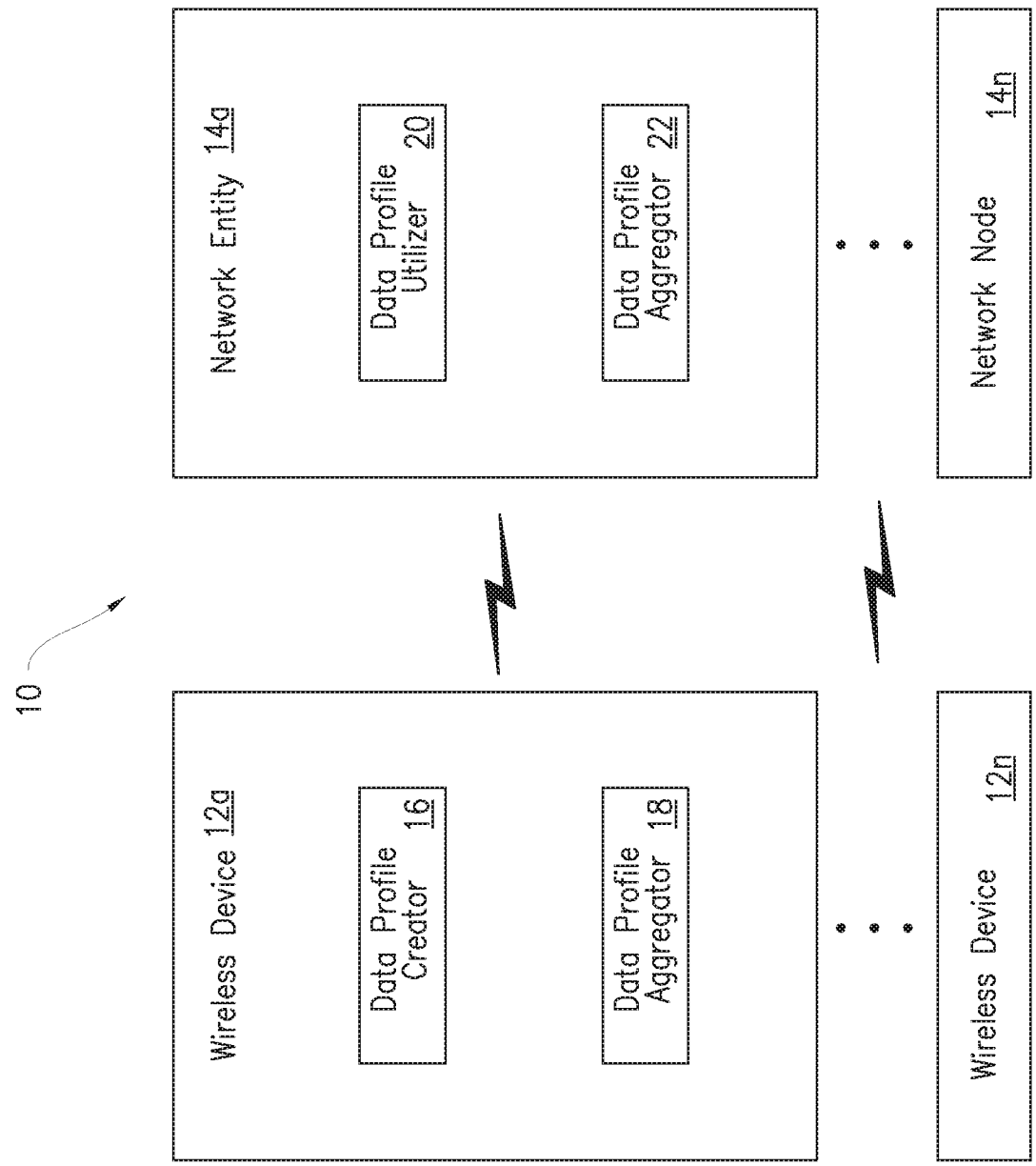
FIG. 1 is a block diagram of an exemplary communications network illustrating a wireless device and network entity configured to aggregate real time data communication requirements for applications running on the wireless device utilizing aspects of the present disclosure.

Before describing in detail exemplary embodiments, it is noted that the embodiments reside primarily in combinations of apparatus components and processing steps related to real time data communication requirements for applications running on a wireless device. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

The data requirements of a given application running on a wireless device are not necessarily fixed. These requirements can change based on, for example, user action, negotiations with a remote server or application, or by the actions taken by the network. Although other network entities may know the maximum or average data requirements, the other network entities are not aware of the actual real-time data usage. In some embodiments, the present disclosure provides embodiments for identifying changes in data requirements for applications running on an application layer of a communication reference model of a wireless device. A data profile is created which captures the identified data requirement changes and the data profile is provided to lower layers, within a given communication reference model. In some embodiments, an aggregate data profile is created where the aggregate data profile represents additional data profiles and the data profile originally captured. This aggregate data profile and/or information (e.g. in the form of one or more message) based on the aggregate data profile can then be transmitted, for example at predetermined time intervals to a network device. The network device, such as a base station or other scheduling entity, can then utilize this real-time data requirement information in order to optimize scheduling and resource management.

Referring now to the drawing figures in which like reference designators refer to like elements there is shown in FIG. 1 an exemplary communication system "10" for identifying changes in data requirements for applications running on a wireless device, aggregating data profiles containing information related to the identified data requirement changes, and communicating messages based on the aggregate data profiles to a network entity to allow the network entity to utilize the aggregate data profiles for more efficient scheduling of the wireless devices. In one embodiment, the network entity itself aggregates the data profiles received from the wireless device.

However, before describing embodiments of the present disclosure, components and other processes of system 10 will be described in detail with respect to FIG. 1 to provide a general understanding of the methods and arrangements disclosed herein.

Communication system 10 includes one or more wireless devices 12a through 12n (referred to collectively herein as wireless device 12). For simplicity, only one wireless device 12a and is shown in FIG. 1, it being understood that more than one wireless device 12a may be implemented. Communication system 10 also includes one or more network entities 14a through 14n (referred to collectively herein as network entity 14) in wireless communication with wireless devices 12a through 12n. For simplicity, only one exemplary network entity 14a is shown in FIG. 1, it being understood that communication system 10 may include more than one network entity 14a.

The network entity 14 described herein can be the serving network node of wireless device 12 or any network node with which wireless device 12 can establish or maintain a communication link and/or receive information, e.g., via broadcast channel. For example, network entity 14a depicted in FIG. 1 and described herein can be any kind of network node which may include a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., Mobile Management Entity (MME), Self-Organizing Network (SON) node, a coordinating node, positioning node, Minimization of Drive Tests (MDT) node, etc.), or even an external node (e.g., 3rd party node, a node external to the current network), wireless access point, etc. Note that herein a base station is but one example of a network entity. Implementations are not limited solely to base stations.

The term "wireless device" as used in the embodiments disclosed herein may refer to any network capable wireless device, such as a user equipment (UE). However, the wireless devices described herein need not be limited to a UE. The wireless devices may be any type of device that is configured or configurable for communication through wireless communication. Examples of such wireless devices are sensors, modems, smart phones, machine type (MTC) devices also known as machine to machine (M2M) devices, personal data assistants (PDAs), iPADs, Tablets, smart phones, laptop embedded equipped (LEE), laptop mounted equipment (LME), USB dongles, etc.

Referring again to FIG. 1, in some embodiments, wireless device 12a includes data profile creator 16 and data profile aggregator 18. Data profile creator 16 is configured to create one or more data profiles, each data profile representing data requirement changes in applications running on wireless device 12. Data profile aggregator 18 is configured to aggregate the data profiles so that aggregate data profile information can be sent to network entity 14. These components and their functions will be discussed in further detail below with regard to FIG. 7. In some embodiments, network entity 14a includes data profile utilizer 20 and data profile aggregator 22. Data profile utilizer 20 is configured to utilize the one or more data profile information received from wireless device 12 for optimally scheduling wireless device 12 and to optimize resource management. Data profile aggregator 22 is configured to aggregate the data profiles received from wireless device 12. These components and their functions are discussed in further detail below with regard to FIG. 8.

Wireless device 12 includes a communication reference model having a plurality of communication reference model layers. The communication reference model is implemented across various hardware elements of wireless device 12, e.g., using a communication interface and/or processing circuitry (these components are depicted and described with reference to FIG. 7). In one embodiment, the communication reference model is an open system interconnection (OSI) model having, for example, the following layers (from lowest layer to highest layer): Physical Layer (Layer 1), Data Link (Layer 2), Network (Layer 3), Transport (Layer 4), Session (Layer 5), Presentation (Layer 6) and Application (Layer 7). In one embodiment, the application layer of wireless device 12 gathers information about real time changes in data requirements for the applications running on wireless device 12 and informs one or more lower layers of the real-time data requirements for each application. To achieve this, the application layer conveys a data profile to a lower layer in the OSI model, such as, for example, the media access control (MAC) layer in the Data Link. Each time the data requirements change for a given application, the application layer may send another data profile to one or more lower layers to replace the previous one. Although the OSI model is described as an example communication reference model, the disclosure is not limited solely to the OSI model.

Figure 2:
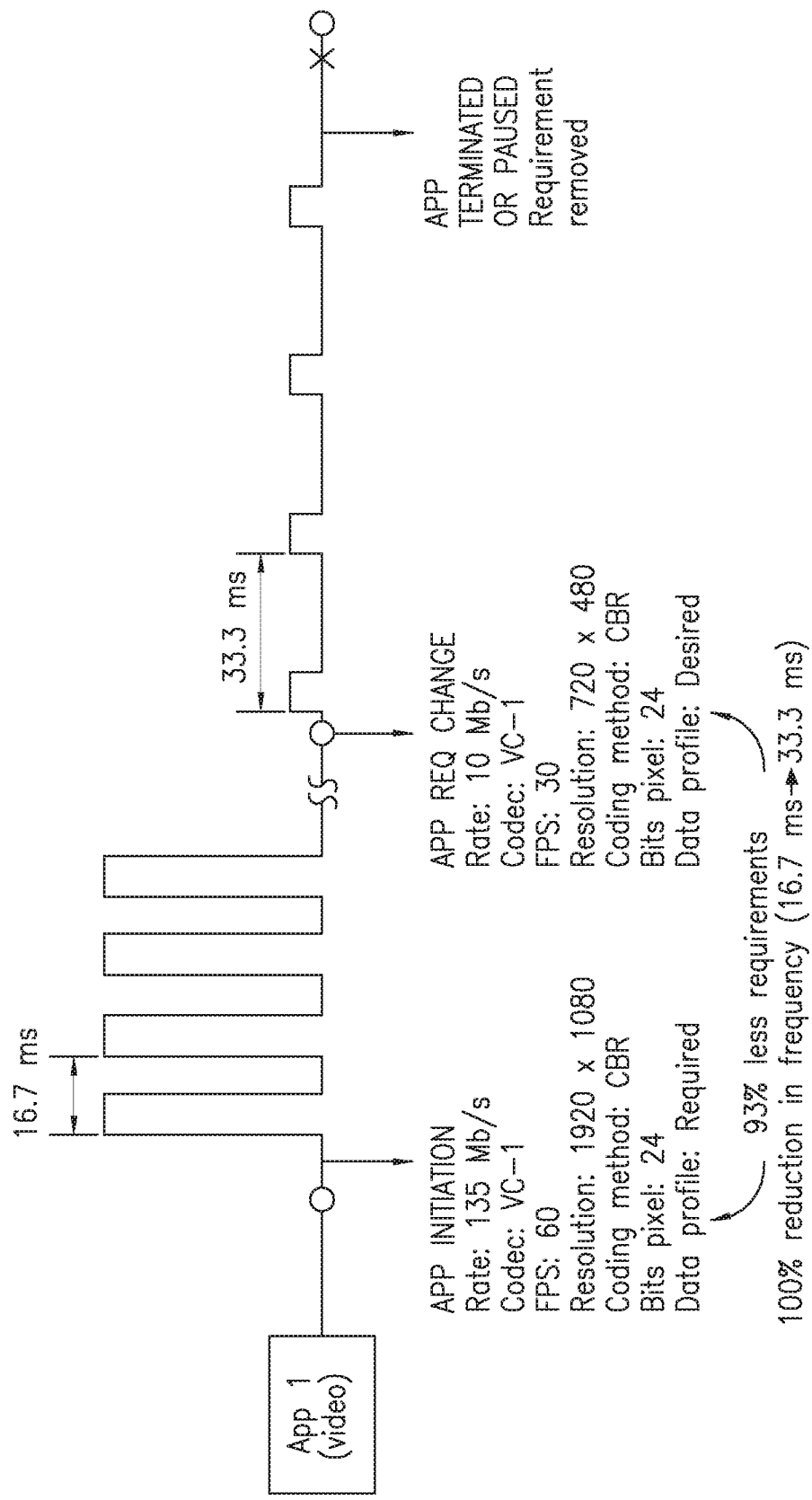
FIG. 2 is a timing diagram illustrating an application running on a wireless device dynamically changing its data requirements.

FIG. 2 illustrates an exemplary video application running on wireless device 12, where the application dynamically changes its data requirements. When the video application is first initiated, it required a CBR of 135 MB/s with a frame frequency of 60 frames per second (FPS). Assume that at some point later in time, the bitrate requirements drop to 10 MB/s with a frame frequency of 30 FPS. This might happen, for example, when the user changes settings in an application or if there is a session initiation protocol (SIP) negotiation with the video server or a far end wireless device 12, or by other means. In this scenario, the only entity that is aware that the actual application data requirements dropped by 93% is the wireless device 12 running the application.

The actual data in the data profile need not be fixed and can be expanded or decreased as is applicable for a given application. The data profile may be updated and/or may be conveyed to any of the lower layers at times when a change occurs in the application such as, for example, when an application is initiated, stopped, paused or any time a material change in the data needs changes. There is no limit to the number of times a data profile may be conveyed to the lower layer(s) and also no limit as to the number of different data profiles (i.e., a data profile for each application) that may be conveyed to the lower layer(s). In one embodiment, a lower layer that receives the data profiles (i.e., the MAC layer in the Data Link) from the application layer (directly or via intermediate layers in the communication the reference model), may then aggregate the data profiles into one aggregate data profile. In another embodiment, the different data profiles are sent from the wireless device 12 to the network entity 14 which aggregates itself the different data profiles received from the wireless device 12. In one embodiment, the aggregate data profile may also include other information (e.g., information about the type of application(s) embodied in the data profiles) that wireless device 12 may wish to convey to network entity 14 in order to allow network entity 14 to optimally schedule wireless device 12 and to facilitate its resource management strategy.

Figure 3:
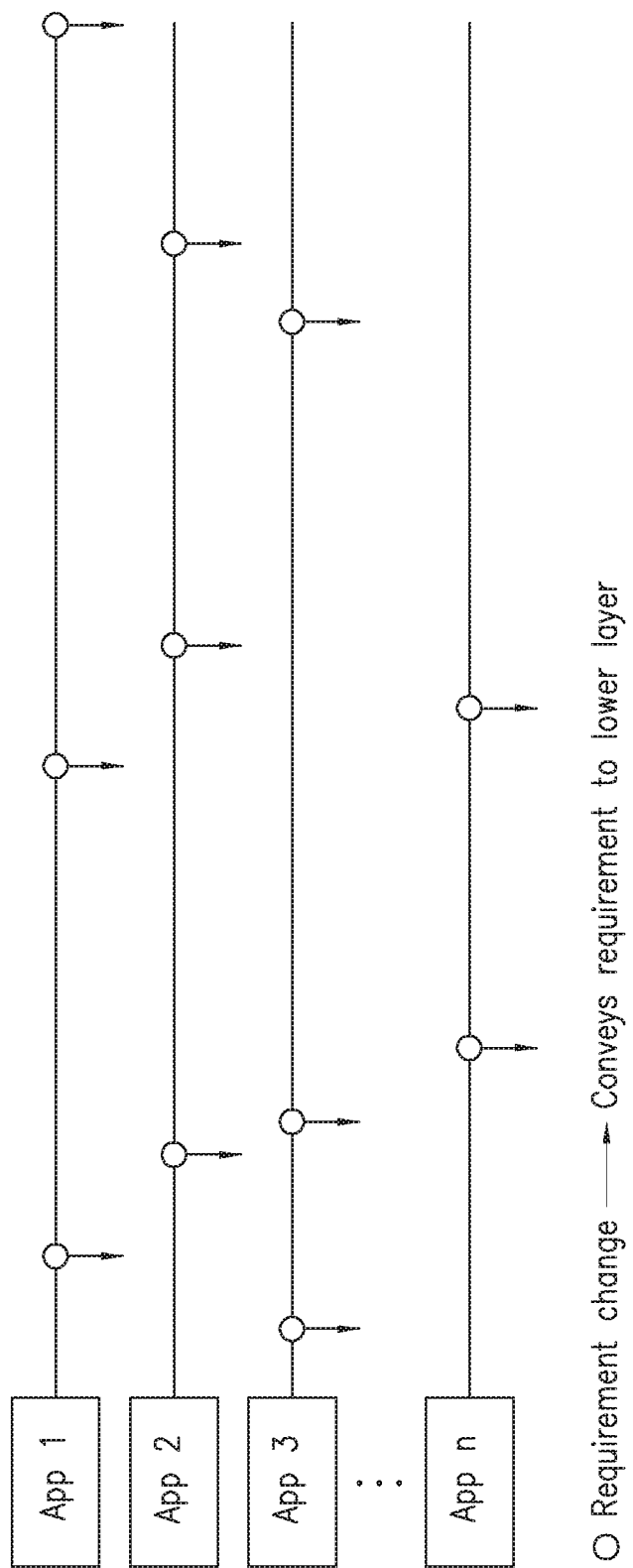
FIG. 3 is a timing diagram illustrating multiple applications running on a wireless device.

FIG. 3 depicts an example of a number of applications running in parallel on wireless device 12. For example, applications (App 1, App 2, App 3, and App n) are shown on a time line where requirement changes are indicated. As can be seen in FIG. 3, more than one data requirement change may occur for a particular application over a period of time. When the data requirement change is identified, the data requirement change is forwarded to a lower level in the communication reference model, in the form of a data profile. In one embodiment, the lower level receiving the data profile is the MAC level. The actual data requirements for each application could change dynamically which could result in significant real-time wireless device level data requirements over time. Using the procedures defined herein, dynamic application data requirement changes will directly trigger updates from wireless device 12 to network entity 14.

As discussed above, application data is passed from the wireless device application layer to one or more communication reference model lower layers of wireless device 12. The application layer may also convey to the lower layers information required to allow wireless device 12 to make an accurate data pattern assessment when sending data profiles to network entity 14. Depending on the nature of the application, the uplink or downlink data pattern requirements might be quite different, or may be similar.

The following are non-limiting examples of the type of information that may be conveyed from the application layer to lower levels of the communication reference model of wireless device 12 and thus used in an aggregate data profile.

For a video application, the following is an example of the information which may be conveyed from the application layer to one or more lower layers:

Uplink Requirements
  The frame rate—for example, 60 frames per second (FPS) or 15 FPS
  The resolution in pixels—for example, 480×270 or 3840×2160
  Bits per pixel—for example, 8 bit or 24 bits
  Video codec—for example, H.265 or windows media video (WMV)
  Coding method—constant bit rate (CBR) or variable bit rate (VBR).
  Maximum bit rate—for example: 20 Mbps or 256 kbps
  Transport Protocol: User Datagram Protocol (UDP)
Downlink Requirements
  The frame rate—for example—60 FPS or 15 FPS
  The resolution in pixels—for example: 480×270 or 3840×2160
  Bits per pixel—for example: 8 bit or 24 bits
  Video codec—for example—H.265 or WMV
  Coding method—CBR or VBR
  Maximum bit rate—for example: 20 Mbps or 256 kbps
  Transport Protocol: UDP
For each audio stream, the following is an example of the information which may be conveyed:

Uplink Requirements
  Audio frame frequency—for example—20 ms
  Audio codec—for example—Adaptive multi-rate (AMR)
  Codec bit rate—for example: 4.75 kbps or 12.2 kbps
  Transport Protocol: Transmission Control Protocol (TCP)
Downlink Requirements
  Audio frame frequency—for example—20 ms
  Audio codec—for example—AMR
  Codec bit rate—for example: 4.75 kbps or 12.2 kbps
  Transport Protocol: TCP At a minimum, an application which is not video or audio may convey the frequency and nature of the data requirements for both the uplink and downlink transmissions. For example—Frequency of 80 ms, Max size: 3 Mb.

The following is a discussion of media source requirements for different types of applications, i.e., audio and video.

The overall resource requirements for audio can vary greatly, depending on the compression scheme, the sample rate and the number of channels (e.g. mono vs. stereo). There are many different types of codecs with differing (some are multi-rate) bit rate requirements. These include standardized codecs, such adaptive multi-rate wideband (AMR-WB), enhanced variable rate codec (EVRC), G.711 and "Internet" codecs, such as Internet lower bit rate codec (iLBC) or SPEEX. SPEEX, for example, can have a maximum bit rate of about 44 kbps, or as little as 2 kbps, depending on compression settings. The exact bit rate requirements are currently only known by the application layer because it is the application which configures or negotiates which codec to use, and the codec settings.

The overall resource requirements for video can vary greatly (even more than audio), depending on the screen size (number of pixels), frame rate (FPS), bits per pixel, the amount and type of compression. There are many different video codecs with significantly different throughput requirements. Typical video codecs include Moving Picture Experts Group (MPEG)-2, MPEG-3, VC-1. With the VC-1 video codec, for example, the bit rate can vary between 96 kbps (176×44 @ 15 FPS) and 135 Mbps (1920×1080 @ 60 FPS). The actual bit rate being used at any given instant is known by the application layer because it is the application layer which negotiates and/or configures the codec settings.

Although media is a large user of data (and hence communication channel resources), there may be applications which require large amounts of signaling bandwidth. This may be the case if the frequency of messaging is high and/or the message lengths are long. This information would be known by the application and may change periodically.

To further understand the dynamic nature of application resource requirements, the following is a summary of some common applications and how the application data resource requirements might be initially set up, and how they might dynamically change.

NETFLIX® is a downlink-intensive application for viewing movies and TV shows. The user configures the application to select the video quality they want. The user should consider the resolution of the device used to view the video when selecting the video quality. A "low" quality setting on NETFLIX® would use about 0.3 Gb/hour and a "high" quality setting may use up to 7 Gb/hour of data for Ultra high definition (HD) (H.265). NETFLIX® uses the user quality selection to determine the codec and codec settings. The user may change the quality settings dynamically within the Application. In one embodiment of the present disclosure, this change is the trigger to convey new requirements to the lower layers which will result in an updated data requirements pattern being sent from wireless device 12 and network entity 14.

USTREAM® is an uplink-intensive application used for webcasting. The user can manually configure the codec (video and voice) to be used, as well as configure other related settings. These settings allow the user to control the uplink bit rate. The user may change the quality settings dynamically within the application. This change may be a trigger to convey new requirements to the lower layers which will result in an updated data requirements pattern being sent from wireless device 12 and network entity 14.

SKYPE® is an audio or video chat/conference program which has similar downlink and uplink data requirements for regular voice and video calls. SKYPE® may determine the best-quality video possible. The video quality can change if the connection quality changes. The changes in video quality may be the trigger to convey new requirements to the lower layers which will result in an updated data requirements pattern being updated data requirements pattern being sent from wireless device 12 and network entity 14.

IP Multimedia Subsystem (IMS)/Voice over Long Term Evolution (VoLTE) is an SIP-based Voice over IP (VoIP) call over LTE. The IMS/VoIP client may use the SDP offer/answer protocol to negotiate which codec and which codec settings will be used. It is possible for the codec or codec settings to dynamically change during a call. This may be used as the trigger to convey new requirements to the lower layers which may result in an updated data requirement pattern being sent between wireless device 12 and network device 14.

Figure 4:
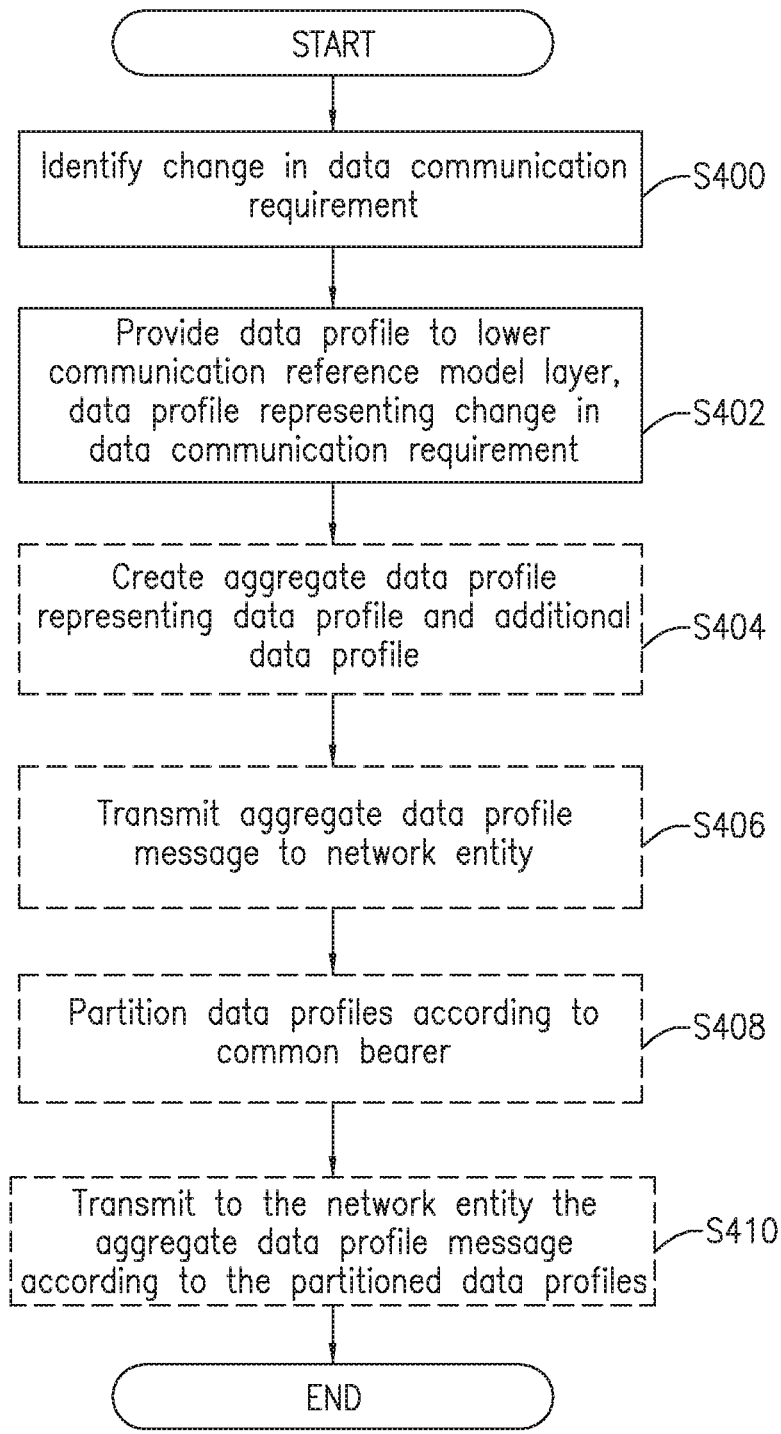
FIG. 4 is a flow diagram illustrating a method of aggregating real time data communication requirements for applications running on the wireless device utilizing aspects of the present disclosure.

FIG. 4 is a flow diagram illustrating a method of processing real time data communication requirements for applications running on wireless device 12 according to one or more embodiments of the present disclosure. The method illustrated can be performed by the data profile creator 16 of wireless device 12 and, in particular, by the processing circuitry 25 of wireless device 12 shown in FIG. 7. Some steps of the method, according to some aspects, may also be performed by the data profile aggregator 18. As described above, a change in a data communication requirement for an application running on an application layer of a communication reference model of wireless device 12 is identified (Block S400). A data profile is then provided to a lower layer of the communication reference model, the lower layer being lower than the application layer, where the data profile represents the change in the data requirements for the application running on the application layer of wireless device 12 (Block S402).

In one embodiment, the method of FIG. 4 also optionally includes creating an aggregate data profile, the aggregate data profile representing additional data profiles and the data profile, where each of the additional data profiles represents changes in data requirements for corresponding applications running on the application layer of wireless device 12 (Block S404). In one embodiment, the lower communication reference model layer is a media access control (MAC) layer of an Open System Communication Interconnection (OSI) communication reference model. In another embodiment, the changes in the data requirements include at least one of starting the application, pausing the application, stopping the application, and any changes to the application that result in a change in data requirements above a threshold amount. In one embodiment, the creating of the aggregate data profile occurs at the MAC layer of the Open System Communication Interconnection (OSI) communication reference model.

In another embodiment, the method optionally includes transmitting an aggregate data profile message to network entity 14 at a first predetermined time interval, the aggregate data profile message based on the aggregate data profile (Block S406). In another embodiment, the method further includes transmitting additional aggregate data profile message to network entity 14 at the first predetermined time interval. The aggregate data profile message may include the actual aggregate data profile and/or other information based on the aggregate data profile that would be useful to network entity 14, such as a recommended scheduling pattern.

In another embodiment, the method further optionally includes partitioning data profiles in the aggregate data profile according to applications for a common bearer (Block S408), and transmitting, to network entity 14, the aggregate data profile message according to the partitioned data profiles (Block S410).

Figure 5:
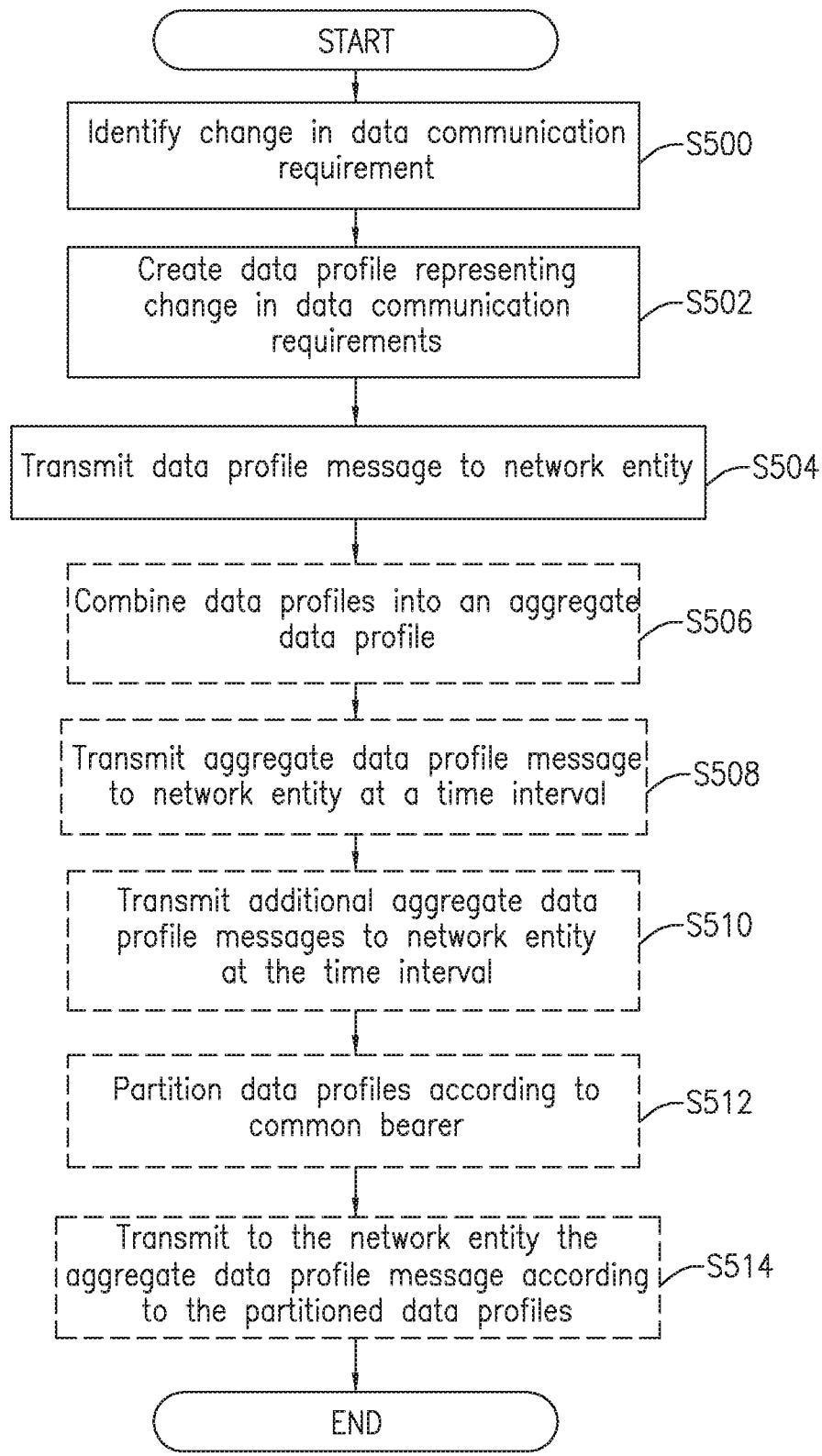
FIG. 5 is a flow diagram illustrating a method of providing a network entity a data profile representing changes in data communication requirements for applications running on the wireless device utilizing aspects of the present disclosure.

FIG. 5 is a flow diagram illustrating a method of providing network entity 14 with a data profile representing changes in data communication requirements for applications running on wireless device 12 according to one or more embodiments of the present disclosure. The method depicted in FIG. 5 can be performed by data profile creator 16 of wireless device 12 and, in particular, by the processing circuitry 25 of wireless device 12 shown in FIG. 7. A change in a data communication requirement for an application running on an application layer of a communication reference model of wireless device 12 is identified (Block S500). At least one data profile is then created where, each of the at least one data profile represents changes in data communication requirements for corresponding applications running on wireless device 12 (Block S502). A data profile messaged based on the at least one data profile is then transmitted to network entity 14 where the at least one data profile message is usable by network entity 14 to manage wireless communications for wireless device 12 (Block S504). Managing wireless communications for wireless device 12 may including, e.g., scheduling of the wireless device 12 and optimizing resource management algorithm decisions made by network entity 14.

In one embodiment, the method shown in FIG. 5 optionally includes combining each of the at least one data profile into an aggregate data profile via data profile aggregator 18 (Block S506) and optionally includes transmitting, to network entity 14 at a first predetermined time interval, an aggregate data profile message based on the aggregate data profile (Block S508). Thus, this embodiment is similar to the embodiment described above with respect to FIG. 4 where wireless device 12 and in some embodiments, the lower level layer, e.g., MAC layer, performs the aggregation of the data profiles such that an aggregate data profile may be sent to network entity 14 rather than multiple, separate data profiles, each representing data requirement changes for individual applications.

In one embodiment, changes in the data requirements include at least one of starting the application, pausing the application, stopping the application, and any changes to the application that result in a change in data requirements above a threshold amount.

In one embodiment, additional aggregate data profile messages are optionally transmitted to network entity 14 at the first predetermined time intervals (Block S510). In one embodiment, the method of FIG. 5 further includes optionally partitioning data profiles in the aggregate data profile according to applications for a common bearer (Block S512) and optionally transmitting, to network entity 14, the aggregate data profile message according to the partitioned data profiles (Block S514). Thus, to enable network device 14 to determine which data profiles relate to applications for a specific bearer, wireless device 12 may transmit a message to network entity 14 conveying this information. In another embodiment of the method shown in FIG. 5, each of the at least one data profile is combined into an aggregate data profile by network entity 14.

The data profiles or aggregate data profiles are transmitted by wireless device 12 to network device 14 in the form of messages. The following is an exemplary aggregate data profile message that may be sent from wireless device 12 to network entity 14. In this example, the aggregate data profile message may identify application profiles according to bearer and/or indicate recommended scheduling patterns. Network entity 14 can respond to wireless device 12 with an acknowledgement (ACK) message.

```
WIRELESS
DEVICE_RESOURCE_AND_SCHEDULING_REQUIREMENTS
APPLICATION_PROFILE_LIST           OPTIONAL
        {
          BEARER_ID-1
              APPLICATION_PROFILE
              APPLICATION_PROFILE
          BEARER_ID-2
              APPLICATION_PROFILE
          BEARER_ID-n
              APPLICATION_PROFILE
          APPLICATION_PROFILE
          APPLICATION_PROFILE
        }
```

```
WIRELESS DEVICE_RECOMMENDED_SCHEDULING_PATTERN
                                   OPTIONAL
        {
          PATTERN LENGTH
          BIT_PATTERN
        }
```

The above message could pass either the APPLICATION_PROFILE_LIST or overall WIRELESS DEVICE_RECOMMENDED_SCHEDULING_PATTERN or both to network entity 14. The BIT_PATTERN may be up to 40 bits long with each bit representing one transmission time interval (TTI).

The WIRELESS DEVICE_RESOURCE_AND_SCHEDULING_REQUIREMENTS message could be sent as often as an interval equal to PATTERN_LENGTH*TTI duration (e.g., 1 ms). It may also be limited to only sending when an overall change in the APPLICATION_PROFILE_LIST and/or WIRELESS_DEVICE_RECOMMENTED SCHEDULING_PATTERN occurs.

Continuously, i.e., periodically, sending the message allows wireless device 12 to inform network entity 14 that (for example) for the upcoming 40 TTI, which TTIs wireless device 12 requests data be optimally scheduled. The APPLICATION_PROFILE will also give the network entity 14 scheduler more accurate information about the actual data requirements.

If the BIT_PATTERN isn't sent at an interval equal to PATTERN_LENGTH*1 mS by wireless device 12, then the pattern is considered to be repeated. For example, if a 10 bit pattern is chosen (e.g. 1110000000) network entity 14 would interpret that as a repeating pattern even through wireless device 12 doesn't resend the pattern every 10 mS (e.g. 1110000000111000000011100000000 . . . ). Note that it is not required that wireless device 12 send both the APPLICATION_PROFILE_LIST and the WIRELESS DEVICE_RECOMMENTED_SCHEDULING_PATTERN information elements for any given session. It should be understood that the above-described message is but one example of a suitable message format and that other message formats may be used to convey the data profiles or aggregate data profiles.

Figure 6:
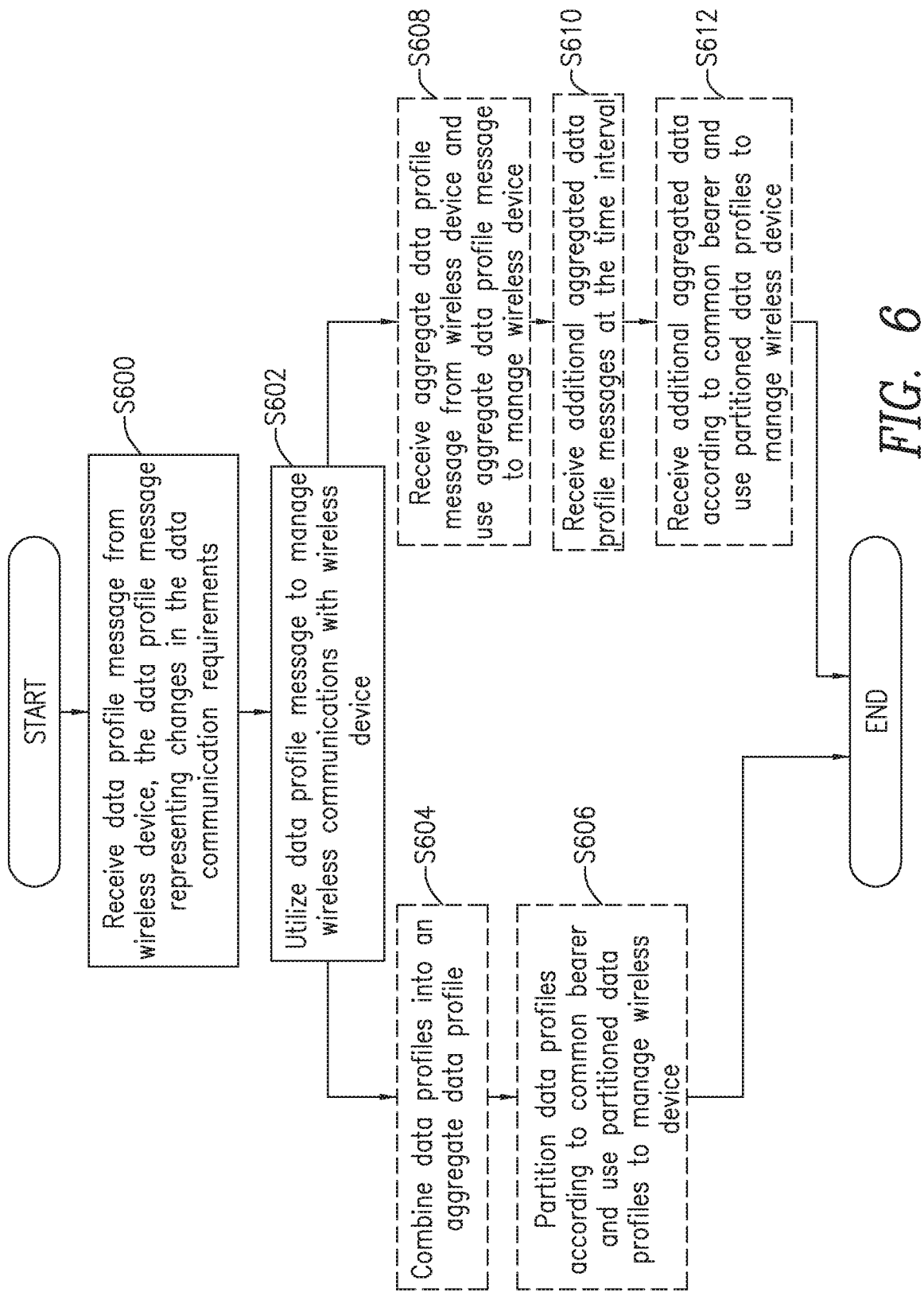
FIG. 6 is a flow diagram illustrating a method, at a network entity, of receiving a data profile from a wireless device the data profile representing changes in data communication requirements for applications running on the wireless device utilizing aspects of the present disclosure.

FIG. 6 is a flow diagram illustrating a method, at network entity 12, of receiving a data profile from wireless device 12, the data profile representing changes in data communication requirements for applications running on wireless device 12 according to one or more embodiments of the present disclosure. The method depicted in FIG. 6 can be performed by network entity 14 and, in particular, by the processing circuitry 32 of network entity 14 shown in FIG. 8.

Referring to FIG. 6, network entity 14 receives, from wireless device 12, at least one data profile message, each of the at least one data profile message representing changes in data communication requirements for a corresponding application running on wireless device 12 (Block S600). Network entity 14 utilizes the received at least one data profile message to manage wireless communications for wireless device 12 (Block S602).

In one embodiment, network entity 14 optionally combines each of the at least one data profile into an aggregate data profile using data profile aggregator 22, the aggregate data profile being used to manage the wireless communications for wireless device 12 (Block S604). Thus, in this scenario, network entity 14 rather than wireless device 12 performs the aggregation of data profiles. In one embodiment, network entity 14 optionally partitions data profiles in the aggregate data profile according to applications for a common bearer, the partitioned data profiles being used, e.g., by data profile utilizer 20, to manage the wireless communications for wireless device 12 (Block S606). Thus, in this scenario, network entity 14 rather than wireless device 12 partitions the data profiles per bearer.

In another embodiment, network entity 14 optionally receives an aggregate data profile message from wireless device 12 at a first predetermined time interval, wherein the aggregate data profile message includes each of the at least one data profiles, the aggregate data profile message being used to manage the wireless communications for wireless device 12 (Block S608). Thus, in this scenario, wireless device 12 performs the aggregation of the data profiles into an aggregate data profile. In one embodiment, network entity 14 optionally receives additional aggregate data profile messages from the wireless device at the first predetermined time interval (Block S610). In one embodiment, network entity 14 optionally receives from wireless device 12, partitioned data profiles, the partitioned data profiles representing data profiles corresponding to applications for a common bearer, the partitioned data profiles being used to manage the wireless communications for the wireless device (Block S612). Thus, in this embodiment, wireless device 12 performs the partitioning of data profiles according to bearer.

Figure 7:
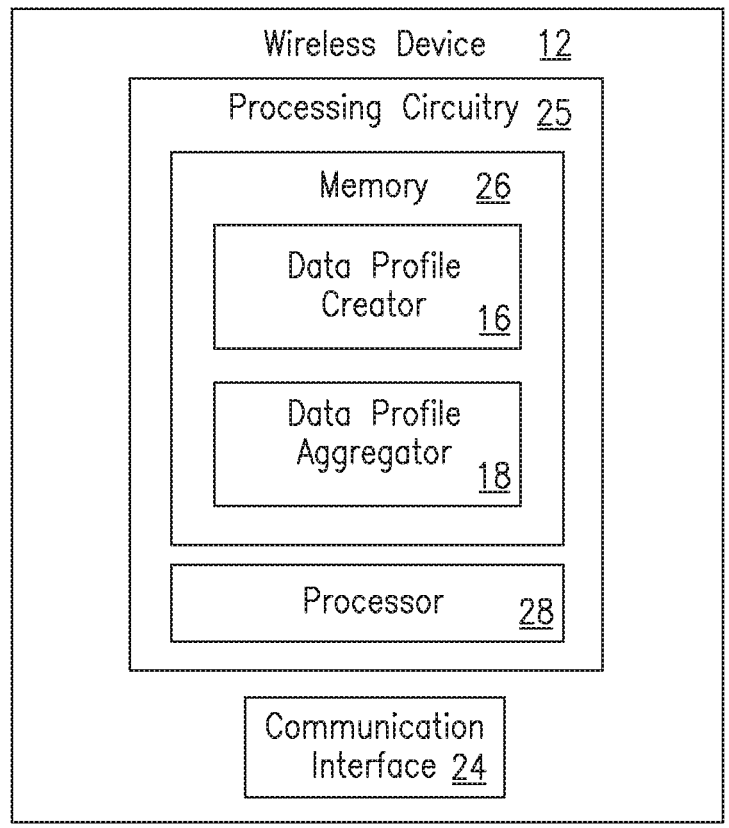
FIG. 7 is a block diagram of a wireless device configured to aggregate real time data communication requirements for applications running on the wireless device utilizing aspects of the present disclosure.

FIG. 7 is a block diagram of wireless device 12 configured to communicate real time data communication requirements for applications running on wireless device 12 according to one or more embodiments of the present disclosure. Referring to FIG. 7, wireless device 12 includes a communications interface 24 and processing circuitry 25. Processing circuitry 25 includes a memory 26 in communication with processor 28. Memory 26 has instructions that, when executed by processor 28, configure processor 28 to perform a variety of functions as described herein including the functions shown in FIG. 4. In addition to a traditional processor and memory, processing circuitry 25 may include integrated circuitry for processing and/or control, e.g., one or more processors and/or processor cores and/or FPGAs (Field Programmable Gate Array) and/or ASICs (Application Specific Integrated Circuitry). Processing circuitry 25 may comprise and/or be connected to and/or be configured to access (e.g., write to and/or read from) memory 26, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 26 may be configured to store code executable by control circuitry and/or other data, e.g., data pertaining to communication, e.g., configuration and/or address data of nodes, etc. Processing circuitry 25 may be configured to control any of the methods described herein and/or to cause such methods to be performed, e.g., by wireless device 12. Corresponding instructions may be stored in the memory 26, which may be readable and/or readably connected to processing circuitry 25. In other words, processing circuitry 25 may include a controller, which may include a microprocessor and/or microcontroller and/or FPGA (Field-Programmable Gate Array) device and/or ASIC (Application Specific Integrated Circuit) device. It may be considered that processing circuitry 25 includes or may be connected or connectable to memory 26, which may be configured to be accessible for reading and/or writing by the controller and/or processing circuitry 25.

In one embodiment, processor 28 is configured to identify a change in a data communication requirement for an application running on an application layer of a communication reference model of wireless device 12. Processor 28 either alone or in conjunction with data profile creator 16 is configured to provide to a lower layer of the communication reference model layer, the lower layer being lower than the application layer, a data profile, the data profile representing the change in the data communication requirements for the application running on the application layer of wireless device 12.

In one embodiment, memory 26 further stores instructions that, when executed, configure processor 28, either alone or in conjunction with data profile aggregator 18, to create an aggregate data profile, the aggregate data profile representing the additional data profiles and the data profile, each of the additional data profiles representing changes in data communication requirements for corresponding applications running on the application layer of wireless device 12.

In one embodiment, the lower communication reference model layer is a media access control (MAC) layer of an Open System Communication Interconnection (OSI) communication reference model. In one embodiment, changes in the data requirements include at least one of starting the application, pausing the application, stopping the application, and any changes to the application that result in a change in data requirements above a threshold amount.

In one embodiment, aggregating additional data profiles with the data profile occurs at a media access control (MAC) layer of an Open System Communication Interconnection (OSI) communication reference model. In one embodiment, communications interface 24 is configured to transmit, to network entity 14 at a first predetermined time interval, an aggregate data profile message based on the aggregate data profile.

In one embodiment, communications interface 24 is configured to transmit additional aggregate data profile messages to network entity 14 at the first predetermined time interval.

In one embodiment, memory 26 further stores instructions that, when executed, configure processor 28 to partition data profiles in the aggregate data profile according to applications for a common bearer, wherein communications interface 24 is configured to transmit, to network entity 14, the aggregate data profile message according to the partitioned data profiles.

Figure 8:
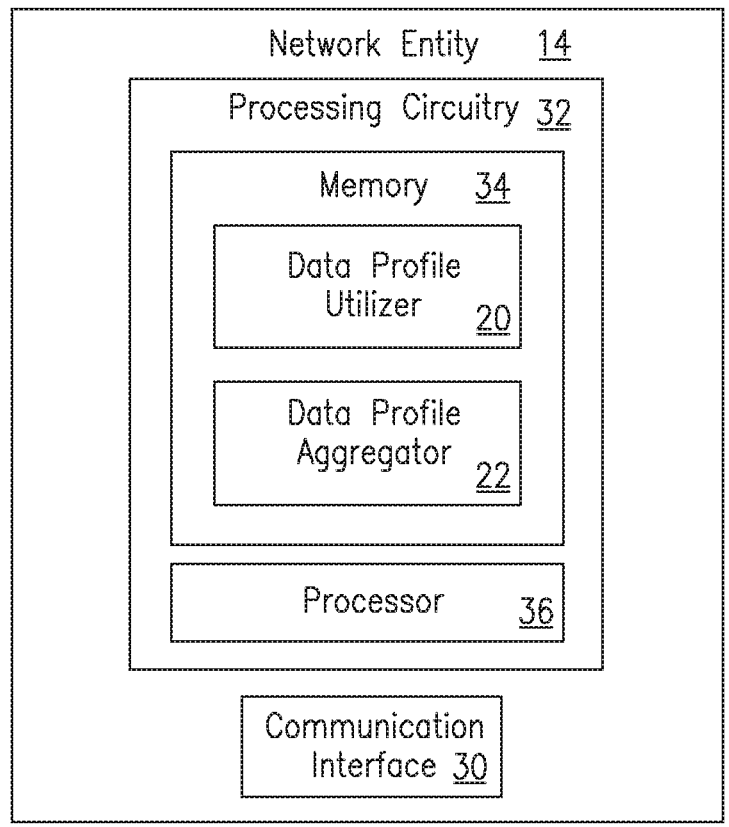
FIG. 8 is a block diagram of a network entity configured to receive, aggregate and utilize data profiles from a wireless device, the data profile representing changes in data communication requirements for applications running on the wireless device utilizing aspects of the present disclosure.

FIG. 8 is a block diagram of network entity 14 configured to receive, aggregate and utilize data profiles from wireless device 12, the data profile representing changes in data communication requirements for applications running on wireless device 12 according to one or more embodiments of the present disclosure. Referring to FIG. 8, network entity 14 includes a communications interface 30 configured to receive, from wireless device 12, at least one data profile message, each of the at least one data profile message representing changes in data communication requirements for a corresponding application running on wireless device 12. Network entity 14 also includes processing circuitry 32 having a memory 34 in communication with a processor 36, where memory 34 has instructions that, when executed by processor 36, configure processor 36 to perform a variety of functions described herein including those depicted in FIG. 5.

In addition to a traditional processor and memory, processing circuitry 32 may include integrated circuitry for processing and/or control, e.g., one or more processors and/or processor cores and/or FPGAs (Field Programmable Gate Array) and/or ASICs (Application Specific Integrated Circuitry). Processing circuitry 32 may comprise and/or be connected to and/or be configured to access (e.g., write to and/or read from) memory 34, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by control circuitry and/or other data, e.g., data pertaining to communication, e.g., configuration and/or address data of nodes, etc. Processing circuitry 32 may be configured to control any of the methods described herein and/or to cause such methods to be performed, e.g., by network entity 14. Corresponding instructions may be stored in the memory 34, which may be readable and/or readably connected to processing circuitry 32. In other words, processing circuitry 32 may include a controller, which may include a microprocessor and/or microcontroller and/or FPGA (Field-Programmable Gate Array) device and/or ASIC (Application Specific Integrated Circuit) device. It may be considered that processing circuitry 32 includes or may be connected or connectable to memory 34, which may be configured to be accessible for reading and/or writing by the controller and/or processing circuitry 32.

In one embodiment, processor 36, either alone or in conjunction with data profile utilizer 20, is configured to utilize the received at least one data profile message to manage wireless communications for wireless device 12.

In one embodiment, memory 34 further stores instructions that, when executed, configure processor 36, either alone or in conjunction with data profile aggregator 22, to combine each of the at least one data profile into an aggregate data profile, the aggregate data profile being used to manage the wireless communications for wireless device 12. In one embodiment, memory 34 further stores instructions that, when executed, configure processor 36 to partition data profiles in the aggregate data profile according to applications for a common bearer, the partitioned data profiles being used to manage the wireless communications for wireless device 12.

In one embodiment, communication interface 30 is further configured to receive an aggregate data profile message from wireless device 12 at first predetermined time intervals, wherein the aggregate data profile message includes each of the at least one data profiles, the aggregate data profile message being used to manage the wireless communications for wireless device 12. In one embodiment, communication interface 30 is further configured to receive additional aggregate data profile messages from wireless device 12 at the first predetermined time intervals. In one embodiment, communications interface 30 is further configured to receive, from wireless device 12, partitioned data profiles, the partitioned data profiles representing data profiles corresponding to applications for a common bearer, the partitioned data profiles being used to manage the wireless communications for wireless device 12.

Of note, although FIGS. 7 and 8 show data profile creator 16, data profile aggregator 18, data profile utilizer 20 and data profile aggregator 22 as being stored in memory devices of processing circuitry, as discussed above, embodiments are not limited solely to such implementations. Because processing circuitry can take forms other than a central processing unit and memory, it is understood that these elements may be implemented in hardware as part of a device.

Figure 9:
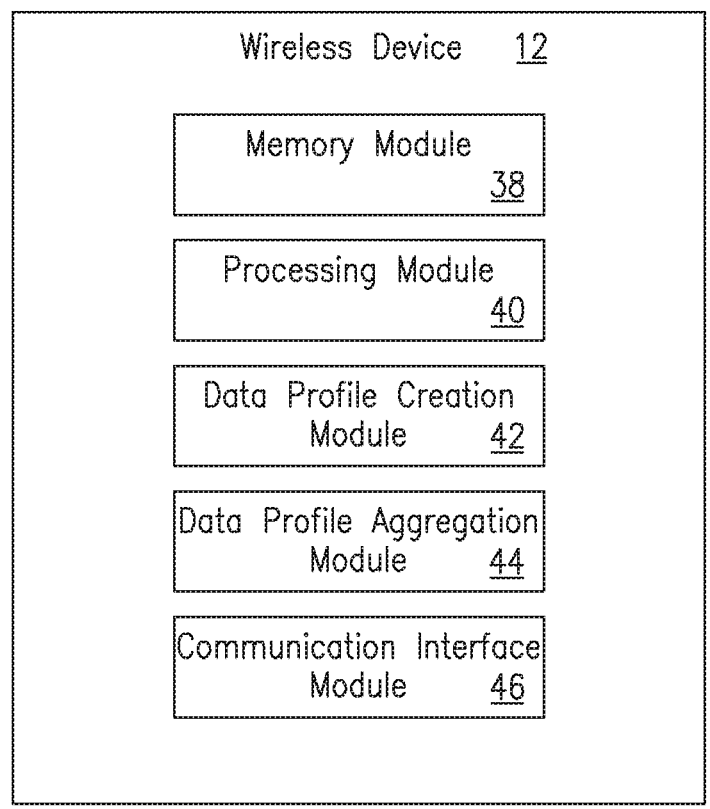
FIG. 9 is a block diagram of an alternate wireless device configured to aggregate real time data communication requirements for applications running on the wireless device utilizing aspects of the present disclosure.

FIG. 9 is a block diagram of alternate wireless device configured to communicate real time data communication requirements for applications running on the wireless device utilizing the principles of the present disclosure.

In one embodiment, wireless device 12 a memory module 38 in communication with a processing module 40. Processing module 40 is configured to identify a change in a data communication requirement for an application running on an application layer of a communication reference model of wireless device 12. Processing module 40 either alone or in conjunction with data profile creation module 42, is configured to provide to a lower layer of the communication reference model layer, the lower layer being lower than the application layer, a data profile, the data profile representing the change in the data communication requirements for the application running on the application layer of wireless device 12. In one embodiment, processing module 40 either alone or in conjunction with data profile aggregation module 44, is configured to create an aggregate data profile, the aggregate data profile representing the additional data profiles and the data profile, each of the additional data profiles representing changes in data communication requirements for corresponding applications running on the application layer of wireless device 12. In one embodiment, communication interface module 46 of wireless device 12 is configured to transmit an aggregate data profile message based on the aggregate data profile to network entity 14 at a first predetermined time interval.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device for communicating real time data communication requirements to a network entity for applications running on a wireless device, the method comprising:
identifying a change in a data communication requirement for an application running on an application layer of a communication reference model of the wireless device;
providing to a lower layer of the communication reference model, the lower layer being lower than the application layer, a data profile, the data profile representing the change in the data requirements for the application running on the application layer of the wireless device;
creating an aggregate data profile, the aggregate data profile representing additional data profiles and the data profile, each of the additional data profiles representing changes in data requirements for corresponding applications running on the application layer of the wireless device, wherein creating the aggregate data profile occurs at a media access control (MAC) layer of an Open System Communication Interconnection (OSI) communication reference model; and
transmitting, to a network entity at a first predetermined time interval, an aggregate data profile message based on the aggregate data profile.

2. The method of claim 1, wherein the lower communication reference model layer is a media access control (MAC) layer of an Open System Communication Interconnection (OSI) communication reference model.

3. The method of claim 1, wherein changes in the data requirements include at least one of starting the application, pausing the application, stopping the application, and any changes to the application that result in a change in data requirements above a threshold amount.

4. The method of claim 1, further comprising transmitting additional aggregate data profile messages to the network entity at the first predetermined time interval.

5. The method of claim 1, further comprising:
partitioning data profiles in the aggregate data profile according to applications for a common bearer; and
transmitting, to the network entity, the aggregate data profile message according to the partitioned data profiles.

6. A wireless device configured to communicate real time data communication requirements for applications running on the wireless device, the wireless device comprising:
a communications interface; and
processing circuitry comprising:
a memory; and
a processor, the memory in communication with the processor, the memory having instructions that, when executed by the processor, configure the processor to:
identify a change in a data communication requirement for an application running on an application layer of a communication reference model of the wireless device;
provide to a lower layer of the communication reference model layer, the lower layer being lower than the application layer, a data profile, the data profile representing the change in the data communication requirements for the application running on the application layer of the wireless device; and
create an aggregate data profile, the aggregate data profile representing the additional data profiles and the data profile, each of the additional data profiles representing changes in data communication requirements for corresponding applications running on the application layer of the wireless device, wherein aggregating additional data profiles with the data profile occurs at a media access control (MAC) layer of an Open System Communication Interconnection (OSI) communication reference model;
wherein the communications interface is configured to transmit, to a network entity at a first predetermined time interval, an aggregate data profile message based on the aggregate data profile.

7. The wireless device of claim 6, wherein the lower communication reference model layer is a media access control (MAC) layer of an Open System Communication Interconnection (OSI) communication reference model.

8. The wireless device of claim 6, wherein changes in the data requirements include at least one of starting the application, pausing the application, stopping the application, and any changes to the application that result in a change in data requirements above a threshold amount.

9. The wireless device of claim 6, wherein the communications interface is configured to transmit additional aggregate data profile messages to the network entity at the first predetermined time interval.

10. The wireless device claim 6, wherein the memory further stores instructions that, when executed, configure the processor to partition data profiles in the aggregate data profile according to applications for a common bearer, wherein the communications interface is configured to transmit, to the network entity, the aggregate data profile message according to the partitioned data profiles.

11. A method implemented in a network entity for managing wireless device communications based on real time data communication requirements for applications running on the wireless device, the method comprising:
receiving in a lower layer of the communication reference model layer, the lower layer being lower than the application layer, from the wireless device, at least one data profile message, each of the at least one data profile message representing changes in data communication requirements for a corresponding application running on an application layer of a communication reference model of the wireless device; and
utilizing the received at least one data profile message to manage wireless communications for the wireless device, wherein the data profile representing the change in the data communication requirements for the application running on the application layer of wireless device;

in response to utilization, combining each of the at least one data profile into an aggregate data profile, and receiving an aggregate data profile message from the wireless device at a first predetermined time interval, wherein the aggregate data profile message includes each of the at least one data profiles, the aggregate data profile message being used to manage the wireless communications for the wireless device.

12. The method of claim 11, further comprising partitioning data profiles in the aggregate data profile according to applications for a common bearer, the partitioned data profiles being used to manage the wireless communications for the wireless device.

13. The method of claim 11, further comprising receiving additional aggregate data profile messages from the wireless device at the first predetermined time interval.

14. The method of claim 13, further comprising:

receiving, from the wireless device partitioned data profiles, the partitioned data profiles representing data profiles corresponding to applications for a common bearer, the partitioned data profiles being used to manage the wireless communications for the wireless device.

15. A network entity configured to manage wireless device communications with real time data communication requirements of applications running on the wireless device the network entity comprising:

a communication interface configured to receive, in a lower layer of the communication reference model layer, the lower layer being lower than the application layer from the wireless device, at least one data profile message, each of the at least one data profile message representing changes in data communication requirements for a corresponding application running on an application layer of a communication reference model of the wireless device; and processing circuitry comprising:

a memory, and a processor, the memory in communication with the processor, the memory having instructions that, when executed by the processor, configure the processor to:

utilize the received at least one data profile message to manage wireless communications for the wireless device, wherein data profile representing the change in the data communication requirements for the application running on the application layer of wireless device; and in response to utilization, wherein the memory further stores instructions that, when executed, configure the processor to perform one of:

combine each of the at least one data profile into an aggregate data profile, and receive an aggregate data profile message from the wireless device at a first predetermined time interval, wherein the aggregate data profile message includes each of the at least one data profiles, the aggregate data profile message being used to manage the wireless communications for the wireless device.

16. The network entity of claim 15, wherein the memory further stores instructions that, when executed, configure the processor to partition data profiles in the aggregate data profile according to applications for a common bearer, the partitioned data profiles being used to manage the wireless communications for the wireless device.

17. The network entity of claim 15, the communication interface further configured to receive additional aggregate data profile messages from the wireless device at the first predetermined time interval.

18. The network entity of claim 15, the communications interface further configured to:

receive, from the wireless device partitioned data profiles, the partitioned data profiles representing data profiles corresponding to applications for a common bearer, the partitioned data profiles being used to manage the wireless communications for the wireless device.

* * * * *